E. M. WRIGHT.
Seed Planter.
No. 48,229.
Patented June 13, 1865.
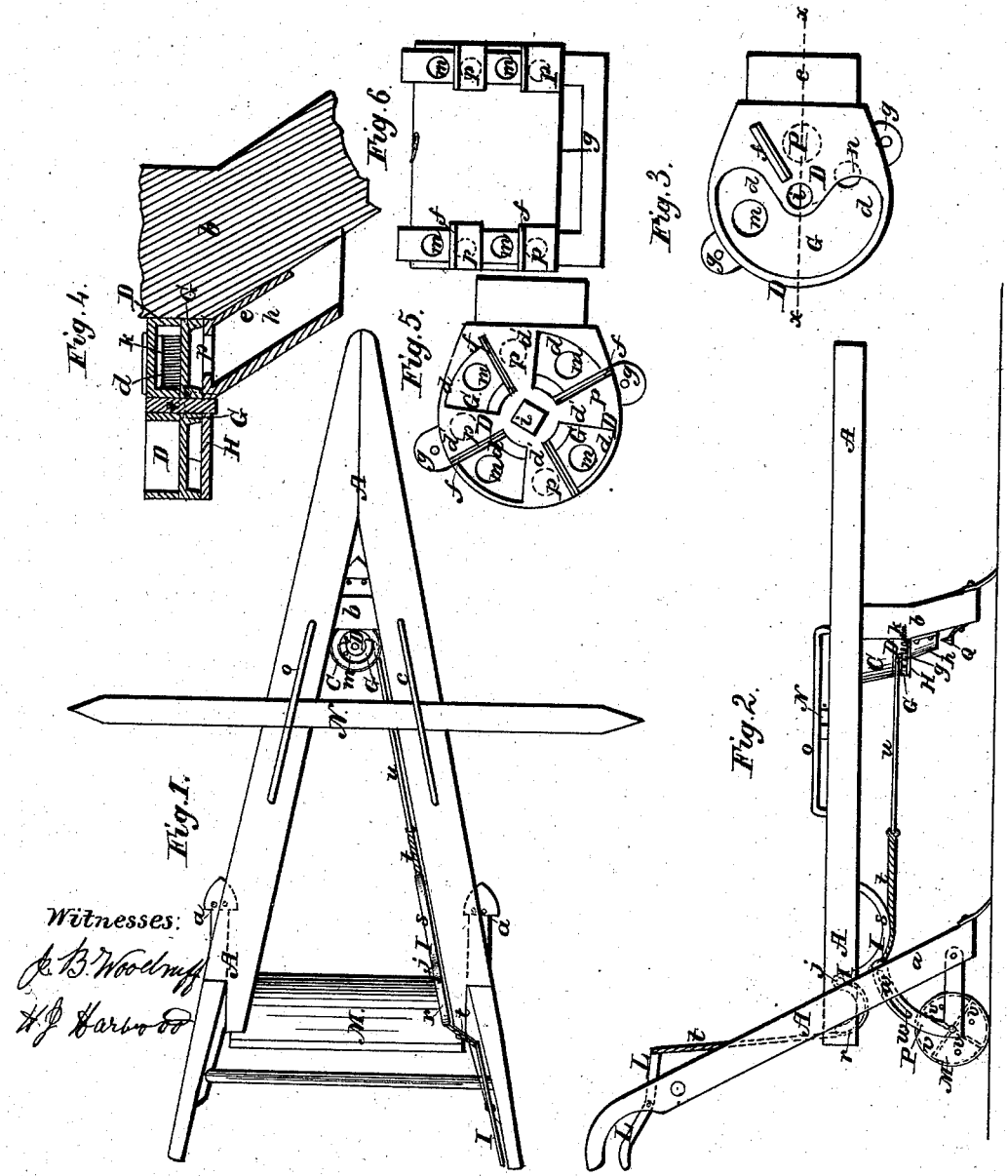

UNITED STATES PATENT OFFICE.

E. M. WRIGHT, OF WILMINGTON, OHIO, ASSIGNOR TO HIMSELF AND A. C. DIBOLL.

IMPROVEMENT IN CORN-PLANTERS.

Specification forming part of Letters Patent No. 48,229, dated June 13, 1865.

*To all whom it may concern:*

Be it known that I, E. M. WRIGHT, of Wilmington, in the county of Clinton and State of Ohio, have invented a new and Improved Corn-Planter; and I do hereby declare that the following is a full and exact description thereof, reference being had to the accompanying drawings, making part of this specification.

Figure 1 is a plan of the corn-planter; Fig. 2, a side elevation thereof; Fig. 3, a plan of the corn-dropping apparatus on a larger scale; Fig. 4, a vertical section of the same, in a plane indicated by the line $x$ $x$, Fig. 3; Figs. 5 and 6, modifications of the dropping apparatus.

Like letters designate corresponding parts in all of the figures.

The main feature of my invention consists in a peculiar seed-dropping apparatus of light and simple construction, and so arranged that it can be applied to an ordinary cultivator, and be removable therefrom at pleasure.

The drawings represent the invention applied to a common three-tooth cultivator, A, for planting a single row at once; but a wider cultivator, with numerous teeth, may be used, so as to apply several of the dropping apparatus, to plant several rows at a time.

To the shank or standard $b$ of the forward tooth—say of a three-tooth cultivator—this seed-dropping apparatus is attached, by means of screws and flanges on the lower tube or seed-conducting portion thereof. A plate, H, which has a shank, $e$, fitting down into a socket of the tubular portion $h$, sustains the other parts above, and serves as a seat on which the seed-dropping wheel G turns or vibrates horizontally, there being a pivot-pin, $i$, projecting upward from the plate, around which the said seed-wheel moves as a center. Immediately above this seed-wheel, but not resting on it, is the seed-box D, which contains the seeds or corn, and supplies the seed-wheel. This seed-box is concentric with the seed-wheel G, but does not turn nor interfere with the wheel's turning. It may be supported either by flanges outside of the seed-wheel, securing it to the sustaining-plate H below, or, in a simpler manner, by resting on an enlargement or hub of the pin $i$, as shown in red lines at $w$, Fig. 4, the seed-wheel moving round said hub. Above the seed-box D a simple hopper, C, to hold a supply of the corn or other seed is situated. The seed-box D has a concentric space, $d$, occupying only a portion of its circumference, open through its whole thickness, as shown in Fig. 3, so that the corn therein can lie on the seed-wheel G. The outlines of this space are closed down to the surface of the seed-wheel. The space is not only concentric, but spiral, in its arrangement, so that the bottom is a continuous inclined plane throughout the whole periphery, thus insuring the conduction of the seed to the portion opening through upon the dropping-wheel, where the aperture is quite small, and allows but little weight of grain to rest on said wheel; hence the dropping is made easier and surer in its action. In the opposite side of the seed-box is an inclosed space, $d'$, covered on top, but open below upon the seed-wheel, as shown in Fig. 4.

The seed-wheel G has a seed-aperture, $m$, through it near one edge, so as to move both under the open space $d$ and the closed space $d'$ of the seed-box. It is large enough to contain and measure out the required number of grains of corn or other seeds for dropping in one hill. Near its opposite edge is another seed-aperture, $n$, of smaller dimensions, so as to contain and measure out smaller grains or a smaller number of them, so that by shifting the wheel's position merely one-half of a circle either of the seed-apertures may be brought into use as required, while the other does not act nor interfere with the action of the one in operation. The aperture in operation receives the grains of corn from the space $d$ of the seed-box, and a vibratory or turning motion is given then to the seed-wheel sufficient to bring this aperture directly over a corresponding aperture, $p$, Fig. 4, in the plate H under the closed port $d'$ of the seed-box D and opening into the spout or seed-conducting tube $h$, which conveys the grains nearly to the ground and drops them into the hill or furrow. The seed-wheel is then turned back till the seed-aperture again comes under the open space $d$ of the seed-box for another supply of corn to drop into the next hill, and so on continually. A brush, $f$, projecting downward from the seed-box, sweeps off the surplus grains of corn situated on those in the seed-aperture. The brush is secured by wedges or otherwise in the top of the seed-box.

In Fig. 5 is shown a modification of the seed-box and seed-wheel. Here, instead of dropping all the grains of corn together from one aperture, there are four (more or less) apertures, *m m m m*, in the seed-wheel, each to contain only a single grain of corn, and four seed-spaces, *d d d d*, in the seed-box to supply these four apertures at once, as well as an equal number of covered spaces, *d' d' d' d'*, each provided with a brush, *f*, leading to the same number of apertures *p p p p* through the plate H below. By this arrangement the grains are well scattered in the hill or furrow. A modification of this separately-seeding arrangement is shown in Fig. 6, representing merely a straight forward-and-backward motion of the seed-plate instead of the circular vibratory motion of the seed wheel or disk.

Another way of scattering the grains in the hill or furrow is by a scatterer, Fig. 2, situated directly and centrally below the conducting-tube *h*, being attached to the standard *b* of the drill-tooth. This scatterer is pointed at the top and flares or widens downward, as shown, on all sides, so as to separate the grains in different directions.

The seed-wheel G is moved by the hand of the driver, so as to drop the corn at the cross furrows or marks. A lever, L, is pivoted to one of the handles of the cultivator, as shown in the drawings. The motion is communicated from this lever to the seed-wheel by the following device:

A lever, I, having its two arms, *r* and *s*, curved nearly or exactly in the arc of a circle, and grooved in their outer peripheries, is pivoted to the frame of the machine at *j*. A cord, *t*, extends from the lever L down to and around the short curved arm *r* of the lever I; then around the long arm *s*, and thence to an ear or projection on the seed wheel or plate G, or is attached to a wire or rod, *u*, which completes the connection. By depressing the lever L under the handle the lever I is turned on its pivot so as to cause the long arm *s* to take up the cord *t*, and consequently to draw the attached side of the seed-wheel round backward, as required, to drop the corn through the aperture *p*. When the lever L is let alone again a spring, *k*, Fig. 2, draws forward that side of the seed-wheel again and brings the levers into their former position. The doubly-curved lever I is a very simple and cheap device for changing and applying the motion, and effects what no other arrangement can do so readily—namely, multiplies the motion of the seed-wheel to any extent desired, so that a very little movement of the lever L will produce the desired result. This is done by increasing the circle of the arm *s* compared with that of the arm *r*.

I employ a guide-rod, N, for guiding the eyes of the attendant in dropping the corn just where the cross-furrows are crossed. This guide-rod is a straight rod placed across the top of the frame at right angles to the motion of the machine. When this rod comes between the eyes of the attendant and a cross furrow or mark he depresses the lever L. This rod is adjustable in position under the retaining bars *o o*, or by equivalent means.

I also use a roller, M, of peculiar construction for pressing down the earth after the corn is covered by the hind teeth of the planter. It is a hollow cylinder divided into four equal compartments, *v v v v*, by cross-partitions, as shown by dotted lines in Fig. 2. These compartments are filled, or partly filled, with sand or other suitable fine substance, of sufficient weight. Only two opposite ones may contain the sand, or all four may be used, according to the weight desired to be given to the roller. Thus the weight may be graduated to a nicety. Any number of compartments *v v* may be used, but four will be generally found to be sufficient. The roller is adjustable up and down by its bearings, as shown in Fig. 1.

Nearly all the attachable parts of this planter may be made of cast-iron, and consequently at little cost.

What I claim as my invention, and desire to secure by Letters Patent, is—

1. The combination and arrangement of the spiral seed-box D, reversible seed-wheel G, conducting-tube *h*, and pointed seed-scatterer, substantially as and for the purposes herein specified.

2. The double-curved lever I, in combination with the connecting-cords, or their equivalents, working around the peripheries of the curved arms thereof, substantially as and for the purpose specified.

3. The guide-rod H, arranged so as to be properly adjustable to the eyes of the attendant, substantially as and for the purpose herein set forth.

4. The construction of the graduated roller M, substantially as and for the purpose herein specified.

The above specification of my improved corn-planter signed by me this 23d day of May, 1864.

E. M. WRIGHT.

Witnesses:
W. B. FISHER,
FRANKLIN BAYHAN.